S. Richards,

Glass Furnace,

No. 62,887.    Patented Mar. 12, 1867.

Attest:
J. E. Shaw
George E. Buckley.

Inventor.
Samuel Richards

United States Patent Office.

SAMUEL RICHARDS, OF PHILADELPHIA, PENNSYLVANIA.

Letters Patent No. 62,887, dated March 12, 1867.

---

IMPROVEMENT IN GLASS FURNACES.

---

The Schedule referred to in these Letters Patent and making part of the same.

---

TO ALL WHOM IT MAY CONCERN:

Be it known that I, SAMUEL RICHARDS, of the city of Philadelphia, State of Pennsylvania, have invented certain new and useful Improvements in Glass Furnaces; and I do hereby declare that the following is a full, clear, and exact description of the construction and operation of the same, reference being had to the annexed drawings, in which—

Figure 1:
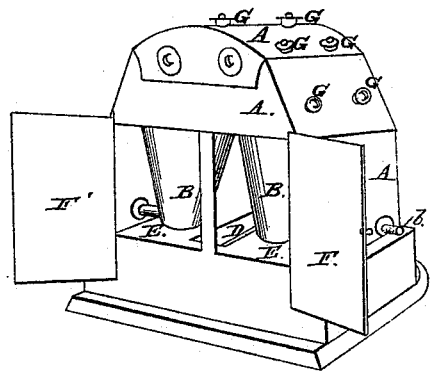
Figure 1 is a perspective view of my improved furnace.
Figure 2:
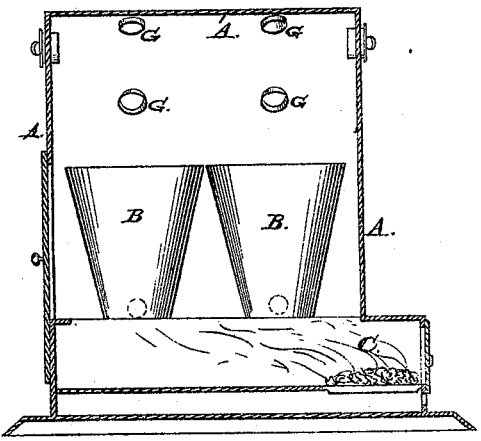
Figure 2 is a longitudinal vertical section.
Figure 3:
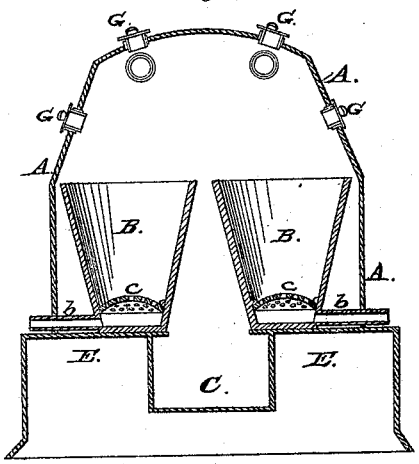

Figure 3, a vertical cross-section.

Hitherto furnaces have been made so as to enclose an unnecessary amount of waste space, which had to be heated, and occasioned a much larger consumption of fuel than is really necessary in the operation of melting glass. Workmen introduced the pots into and removed them from the furnace through the shear-hole by means of an iron bar, and the tone was necessarily made wider than the greatest diameter of the pots in order that the pots could be got in their proper places on the benches after their introduction into the furnace. The pots have been made with almost perpendicular sides.

My improvements consist, first, in providing the furnace with doors, arranged in line with the benches, and reducing the width of the tone, and as a consequence reducing the amount of enclosed space to be heated; second, in making the pots of the tapering form shown, so that when placed side by side on the benches they extend over the tone, expose more side surface to the flame and heat, and have spaces between them for the circulation of flame and heat; third, in putting a strainer in the bottom of each of the pots, and making the pots each with a trough or tube, which, when the pot is in place, projects through an aperture made for the purpose in the furnace wall. My improvements enable me to melt glass with a reduced consumption of fuel, and to utilize the rough or waste glass, and to refine inferior batches.

To enable others skilled in the art to make and use my improvements, I will proceed to describe their construction and mode of operation.

In the drawings, A represents the furnace walls, which are built in the common way of fire-clay. B B are the pots, the bottom diameters of which are at least one-third less than their top diameters. C is the shear-hole; D, the tone or vacant space between the benches E E, on which the pots are set. At the rear of the furnace are the doors F F'. They are made of fire-clay of suitable thickness, and bound with iron. Doors may be used at either end or both ends of the furnace, and they are intended to facilitate the putting of the pots into and their removal from the furnace. G are the apertures through which the glass-blowers insert their blow-pipes into the melted glass contained in the pots. Those pots which are intended to be used in melting the waste glass, or refining inferior batches, are each made with a trough or tubular projection, $b$, (fig. 3,) which trough or projection, when the pot is in place, extends through the wall of the furnace, as shown. A strainer, $c$, made of pot-clay, is fitted over the bottom of the pot, leaving a space between the strainer and the bottom, as shown. These pots are charged through the apertures G with the rough glass or the batch intended to be refined. When the contents of these pots have become sufficiently fused the refined glass drips down through the strainer, and runs out through the tube $b$ into a proper receptacle. When it is not desired to refine the waste glass or inferior batches, pots of the same tapering form, but without the tubular projection $b$ or strainer $c$, are used, in which case the apertures in the walls through which the tubes $b$ project are closed with fire-clay. The furnace is made of such a width that when the pots are in place on the benches their tops meet, or almost meet, over the tone, but the size of the furnace is to be governed by the number and size of the pots intended to be used therein.

Having thus described my improvements I claim, and desire to secure by Letters Patent—

1. The furnace, constructed with doors, and of the width described, in combination with the tapering pots, the whole arranged and operating in the manner and for the purpose substantially as described.

2. Constructing refining pots with the projection $b$, and with or without the strainer $c$, in the manner and for the purpose substantially as shown and described.

SAMUEL RICHARDS.

Witnesses:
   J. E. SHAW,
   GEO. E. BUCKLEY.